(12) United States Patent
Finlay, Sr. et al.

(10) Patent No.: US 7,283,340 B1
(45) Date of Patent: *Oct. 16, 2007

(54) ELECTRICAL WIRING DEVICE

(75) Inventors: David A. Finlay, Sr., Marietta, NY (US); Thomas N. Packard, Syracuse, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/469,604

(22) Filed: Sep. 1, 2006

Related U.S. Application Data

(63) Continuation of application No. 10/884,304, filed on Jul. 2, 2004, now Pat. No. 7,133,266, which is a continuation of application No. 09/971,525, filed on Oct. 5, 2001, now Pat. No. 6,856,498, which is a continuation of application No. 09/718,003, filed on Nov. 21, 2000, now Pat. No. 6,522,510.

(51) Int. Cl.
  *H02H 3/16* (2006.01)
(52) U.S. Cl. ....................................................... 361/45
(58) Field of Classification Search ................. 361/42, 361/77, 45, 49
  See application file for complete search history.

(56) References Cited

U.S. PATENT DOCUMENTS

| | | | |
|---|---|---|---|
| 4,345,289 A * | 8/1982 | Howell .......................... | 361/45 |
| 4,412,193 A | 10/1983 | Bienwald et al. | |
| 4,598,331 A * | 7/1986 | Legatti .......................... | 361/46 |
| 5,202,662 A | 4/1993 | Bienwald et al. | |
| 5,418,678 A * | 5/1995 | McDonald ..................... | 361/46 |
| 5,477,412 A * | 12/1995 | Neiger et al. .................. | 361/45 |
| 5,600,524 A | 2/1997 | Neiger et al. | |
| 5,706,155 A | 1/1998 | Neiger et al. | |
| 5,729,417 A | 3/1998 | Neiger et al. | |
| 5,963,408 A * | 10/1999 | Neiger et al. .................. | 361/45 |
| 6,040,967 A | 3/2000 | DiSalvo | |
| 6,052,265 A | 4/2000 | Zaretsky et al. | |
| 6,111,733 A * | 8/2000 | Neiger et al. .................. | 361/42 |
| 6,226,161 B1 | 5/2001 | Neiger et al. | |
| 6,246,558 B1 | 6/2001 | DiSalvo et al. | |
| 6,288,882 B1 | 9/2001 | DiSalvo et al. | |
| 6,381,112 B1 | 4/2002 | DiSalvo | |
| 6,433,977 B1 * | 8/2002 | Macbeth ....................... | 361/42 |
| 6,437,953 B2 | 8/2002 | DiSalvo et al. | |
| 6,442,007 B1 | 8/2002 | Li | |
| 6,522,510 B1 * | 2/2003 | Finlay et al. .................. | 361/42 |

(Continued)

*Primary Examiner*—Michael Sherry
*Assistant Examiner*—Boris Benenson
(74) *Attorney, Agent, or Firm*—Daniel P. Malley; Bond, Schoeneck & King PLLC

(57) ABSTRACT

The present invention is directed to a protective device that includes a plurality of line terminals and a plurality of load terminals. A wiring state detection circuit is configured to detect a wiring state associated with the plurality of line terminals and the plurality of load terminals. A fault detection circuit is coupled to the plurality of line terminals and configured to generate a fault detection signal in response to detecting at least one fault condition. A circuit interrupter is coupled to the fault detection circuit. The circuit interrupter includes four sets of interrupting contacts configured to provide electrical continuity at least between the hot line terminal and the hot load terminal and the neutral line terminal and the neutral load terminal in a reset state. The four sets of interrupting contacts are open in a tripped state.

36 Claims, 5 Drawing Sheets

U.S. PATENT DOCUMENTS

| | | |
|---|---|---|
| 6,587,319 B1 * | 7/2003 | Finlay, Sr. .................. 361/42 |
| 6,590,753 B1 | 7/2003 | Finlay |
| 6,611,406 B2 | 8/2003 | Neiger et al. |
| 6,628,486 B1 | 9/2003 | MacBeth |
| 6,646,838 B2 | 11/2003 | Ziegler et al. |
| 6,657,834 B2 | 12/2003 | DiSalvo |
| 6,671,145 B2 | 12/2003 | Germain et al. |
| 6,693,779 B2 | 2/2004 | DiSalvo |
| 6,697,238 B2 | 2/2004 | Bonilla et al. |
| 6,717,782 B2 | 4/2004 | DiSalvo et al. |
| 6,734,769 B1 | 5/2004 | Germain et al. |
| 6,771,152 B2 | 8/2004 | Germain et al. |
| 6,788,173 B2 | 9/2004 | Germain et al. |
| 6,807,035 B1 | 10/2004 | Baldwin et al. |
| 6,813,126 B2 | 11/2004 | DiSalvo et al. |
| 6,828,886 B2 | 12/2004 | Germain et al. |
| 6,856,498 B1 | 2/2005 | Finlay, Sr. |
| 6,900,972 B1 | 5/2005 | Chan et al. |
| 6,920,025 B2 | 7/2005 | Nelson |
| 6,946,935 B2 | 9/2005 | Wu et al. |
| 6,958,895 B1 | 10/2005 | Radosavljevic et al. |
| 7,009,473 B2 | 3/2006 | Zhang |
| 7,031,126 B2 | 4/2006 | Bonilla et al. |
| 7,082,021 B2 | 7/2006 | Chan et al. |
| 7,133,266 B1 | 11/2006 | Finlay |
| 2004/0004801 A1 | 1/2004 | Bonilla et al. |
| 2005/0157439 A1 | 7/2005 | Chan et al. |
| 2006/0018062 A1 | 1/2006 | Wu et al. |

* cited by examiner

ELECTRICAL WIRING DEVICE

CROSS-REFERENCE TO RELATED APPLICATIONS

This is a continuation of U.S. patent application Ser. No. 10/884,304 filed on Jul. 2, 2004 now U.S. Pat. No. 7,133,266, which is a continuation of application Ser. No. 09/971,525 now U.S. Pat. No. 6,856,498 filed on Oct. 5, 2001, which is a continuation of application Ser. No. 09/718,003 U.S. Pat. No. 6,522,510 filed Nov. 21, 2000, the contents of which are relied upon and incorporated herein by reference in their entirety, and the benefit of priority under 35 U.S.C. §120 is hereby claimed.

BACKGROUND OF THE INVENTION

1. Field of the Invention

The present invention relates generally to electrical wiring devices, and particularly to protective wiring devices.

2. Technical Background

An electrical distribution system provides power to a house, building or some other facility. Electrical wiring from a power utility provides AC power to one or more breaker panels disposed in the structure. The breaker panel distributes AC power to one or more branch electric circuits installed in the structure. The electric circuits may typically include one or more receptacle outlets and may further transmit AC power to one or more electrically powered devices, commonly referred to in the art as load circuits. The receptacle outlets provide power to user-accessible loads that include a power cord and plug, the plug being insertable into the receptacle outlet. However, certain types of faults have been known to occur in electrical wiring systems. Accordingly, each electric circuit typically employs one or more electric circuit protection devices.

There are several types of electric circuit protection devices. For example, such devices include ground fault circuit interrupters (GFCIs), ground-fault equipment protectors (GFEPs), and arc fault circuit interrupters (AFCIs). This list includes representative examples and is not meant to be exhaustive. Some devices include both GFCIs and AFCIs. As their names suggest, arc fault circuit interrupters (AFCIs), ground-fault equipment protectors (GFEPs) and ground fault circuit interrupters (GFCIs) perform different functions.

A ground fault occurs when a current carrying (hot) conductor creates an unintended current path to ground. A differential current is created between the hot/neutral conductors because some of the current flowing in the circuit is diverted into the unintended current path. The unintended current path represents an electrical shock hazard. A ground fault may occur for several reasons. First, the hot conductor may contact ground if the electrical wiring insulation within a load circuit becomes damaged. This scenario represents a shock hazard. For example, if a user comes into contact with a hot conductor while simultaneously contact ground, the user will experience a shock. A ground fault may also occur when the equipment comes in contact with water. A ground fault may also result from damaged insulation within the electrical power distribution system.

A ground fault creates a differential current between the hot conductor and the neutral conductor. Under normal operating conditions, the current flowing in the hot conductor should equal the current in the neutral conductor. Most GFCIs are configured to take advantage of this fact by comparing the current in the hot conductor to the current in the neutral conductor by sensing the differential current between the two conductors. The GFCI is sensitive to differential currents that represent an imminently dangerous condition, such as the presence of a current path other than the intended path of normal operation (i.e., a shock hazard). Accordingly, when the differential current exceeds a predetermined threshold, usually about 6 mA, the GFCI typically responds by interrupting the circuit. Circuit interruption is typically effected by opening a set of contacts disposed between the source of power and the load. The GFCI may also respond by actuating an alarm of some kind.

One problem associated with protective devices relates to the device being miswired in the filed by an installer. Miswiring refers to a situation wherein the installer couples the line terminals to the load and couples the load terminals to the AC power source. Miswiring may result in the protective device not protecting the user from the fault conditions described above. Labels and installation instruction sheets have been used to prevent miswiring. However, instructive material may be ignored by an installer.

What is needed, therefore, is a protective device that addresses the miswiring issue by detecting the wiring state of the device and inhibiting device operation if the device is miswired.

SUMMARY OF THE INVENTION

The present invention addresses the needs described above by providing a protective device that detects the wiring state of the device and inhibits device operation if the device is miswired. The protective device of the present invention also has an indicator lamp which lights when the device is in the tripped condition and turns off when the device is reset. If the device is miswired after having been wired properly, the indicator lamp does not light when the device is tripped, and so provides a supplemental indication of miswiring. The protection circuit is powered from the hot line bus bar. The indicator lamp is also powered via the hot line bus bar of the interrupting contacts to meet safety standards. The protective device of the present invention also includes circuitry that more effectively guards against damage from transient voltage surges.

One aspect of the present invention is directed to a protective device that includes a plurality of line terminals and a plurality of load terminals. A wiring state detection circuit is configured to detect a wiring state associated with the plurality of line terminals and the plurality of load terminals. A fault detection circuit is coupled to the plurality of line terminals and configured to generate a fault detection signal in response to detecting at least one fault condition. A circuit interrupter is coupled to the fault detection circuit. The circuit interrupter includes four sets of interrupting contacts configured to provide electrical continuity at least between the hot line terminal and the hot load terminal and the neutral line terminal and the neutral load terminal in a reset state. The four sets of interrupting contacts are open in a tripped state.

In another aspect, the present invention is directed to a electrical wiring device that includes line terminals and load terminals. At least one detection circuit is coupled to the line terminals and/or the load terminals. The at least one detection circuit is configured to generate a predetermined signal in response to detecting a wiring condition. The predetermined signal does not simulate a fault condition. An interrupting contact assembly is coupled to the at least one detection circuit. The interrupting contact assembly includes four sets of interrupting contacts that are configured to provide electrical continuity between the line terminals and the load terminals in a closed state and configured to interrupt the electrical continuity in an open state. The interrupting contact assembly is in the open state absent the predetermined signal being provided by the at least one detection circuit.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
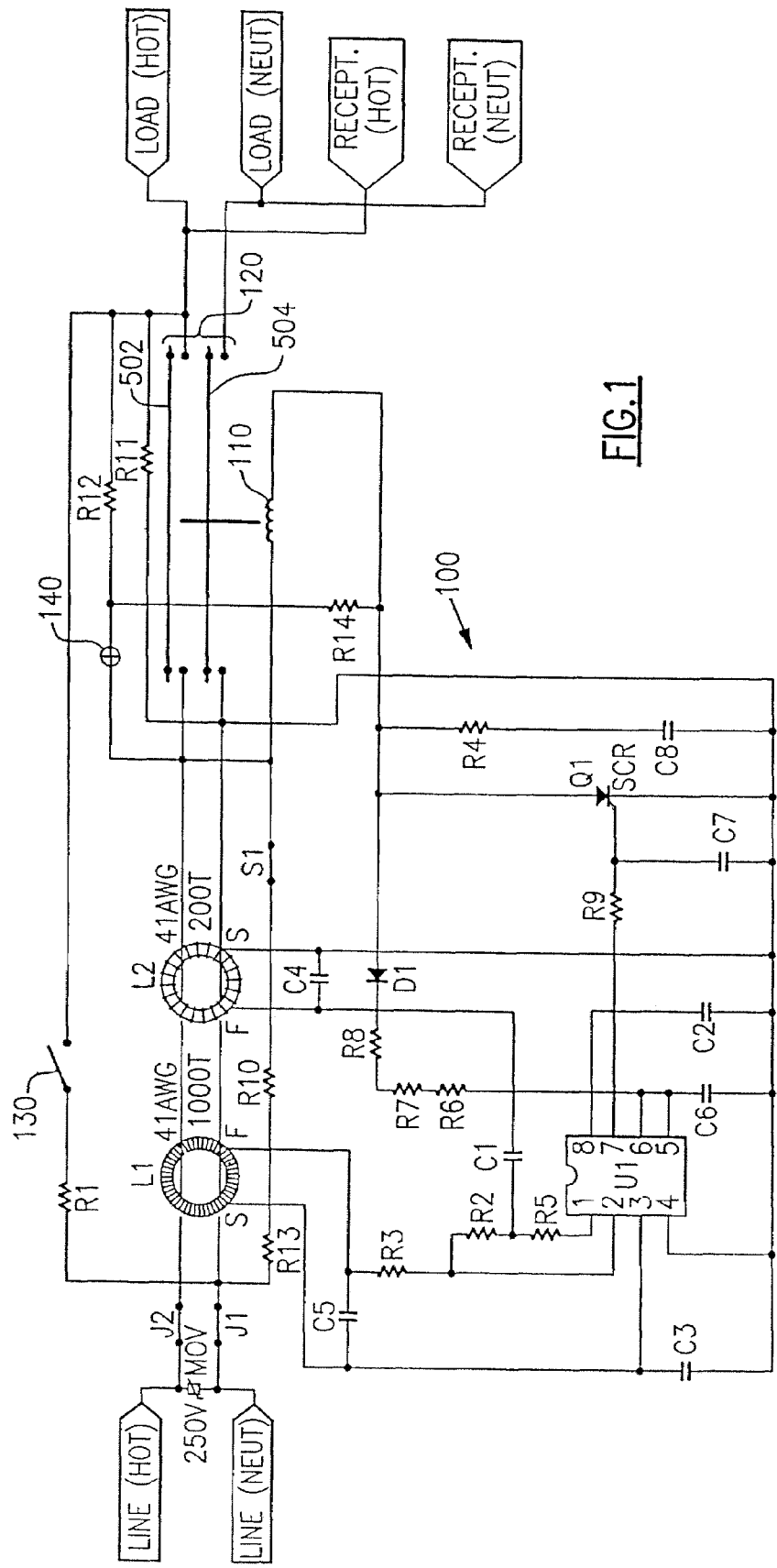
FIG. 1 is a schematic of a GFCI circuit with miswire protection and an indicator lamp according to an embodiment of the invention.

Reference will now be made in detail to the present embodiments of the invention, examples of which are illustrated in the accompanying drawings. Wherever possible, the same reference numbers will be used throughout the drawings to refer to the same or like parts. An exemplary embodiment of the wiring device of the present invention is shown in FIG. 1, and is designated generally throughout by reference numeral 100.

As embodied herein and depicted in FIG. 1, a schematic of a GFCI circuit with miswire protection and an indicator lamp 140 in accordance with an embodiment of the invention is disclosed. The GFCI 100 includes sensing transformers L1 and L2. These transformers are coupled to detector U1. The ground fault circuit sensing electronics of GFCI circuit 100 derives power from the line side terminals of the GFCI. When differential transformer L1 senses unequal amounts of current flowing in the hot and neutral conductors due to a ground fault condition, circuit 100 causes a breaker coil 110 to activate, opening circuit interrupting mechanism 120. Circuit interrupting mechanism 120 includes hot and neutral bus bars 502, 504 that make and break contact with the hot and neutral power lines, respectively. The circuit interrupting mechanism includes four sets of contacts that couple the bus bars to the hot line conductive path to the hot load conductive path and the neutral line conductive path to the neutral load conductive path. As shown in FIG. 1, each bus bar includes two sets of contacts that bridge a line conductive path to a corresponding load conductive path.

GFCI 100 includes a test button 130 induces a simulated ground fault when pushed in and causes breaker coil 110 to activate. In other words, the simulated ground fault generates a differential signal that is sensed and detected by the GFCI circuitry.

GFCI 100 is also equipped with a wiring state detection circuit that includes a fault resistance (R10, R13) that generates a differential current on the primary of the differential current transformer L1 when the GFCI 100 is miswired. The miswire differential current exceeds the level of differential current that the GFCI has been designed to interrupt, typically 6 milliamperes. The fault resistance R10, R13 is on the line side of interrupting contacts 120 electrically located between the line and load terminals of the hot and neutral wire paths. If GFCI 100 is miswired such that power is supplied to the load terminals and GFCI 100 is tripped the detection circuit does not provide a visible miswire indication. Accordingly, the user will attempt to reset the device. At this point, the miswire circuit will generate a differential current and the device will immediately trip. Thus, the device trips every time the user attempts to reset it, signaling to the user that the device is miswired.

When electrical power is correctly connected to the line terminals, it will trip only once (if it is in the reset state). If the device is already in the tripped state, nothing visible happens. Once the device is reset, it will not trip again unless it is responding to a test input or a true fault condition.

The wiring state detection circuit operates as follows. The current that flows through the fault resistance (R10, R13) is derived from the line terminal side of the device. When electrical power is correctly connected to the line terminals, the miswire circuit generates a differential current. If the device is in the reset state, the device will trip in response to the differential current. However, current continues to flow through fault resistance R10, R13 even if the interrupting contacts 120 are open. The differential current generated by the fault resistance clears itself in a short time, typically about 300 ms. The clearance timing is effected by selecting a resistor or resistors whose power rating is greatly exceeded by the current. Thus, the resistor or resistors will open after the predetermined time has elapsed. The estimated time it takes for the fault resistors R10, R13 to "clear" or burn out is greater than 50 ms and typically about 300 ms. After the fault resistance clears, the device may be reset. It will not trip again unless it is responding to a test input or a true fault condition. If the device is already in the tripped condition before power is applied, the wiring state detection circuit again generates the differential current despite the fact that the device is already tripped and the process described above occurs without the intermediate tripping step. This, of course, occurs without the user's knowledge because nothing appears to be happening in the GFCI.

On the other hand, the current flow is interrupted when the device trips in the miswired state. This is because, as noted above, the detection circuit derives power from the line side. Because the trip time of the GFCI is less than or equal to 25 ms, fault resistors R10, R13 do not have enough time to clear. If one attempts to reset the device when in the miswired condition, the device immediately trips out again, and this continues until such time as the device is wired correctly, that is, when power is applied to the GFCI at the line terminals. This effectively results in a GFCI that will not operate, i.e., be able to be reset, until such time as the device is properly wired.

In another embodiment, a fuse (F1 in FIG. 3) is placed in series with the fault resistance R10, R13. Fuse F1 has a properly selected $I^2t$ rating such that the fuse blows instead of the fault resistance R10, R13. Accordingly, the term "resistive element" as used herein refers to either a resistance or a fuse. Once the device has been properly wired by connecting AC power to the line terminals the device is reset operates normally.

Two interesting issues with this miswire protection concept are how to perform the Underwriters Laboratories Standard 943 required tests during manufacturing of the protective device without the differential current produced by the fault resistor affecting the test results, or causing the fault resistor to clear in the manner previously described.

One solution is to place a normally closed switch S1 in series with the fault resistance R10, R13 previously described as producing the differential current. This switch S1 is preferably a flexible conductive spring arm that normally rests against a contact on the top side of the printed circuit board. Directly below the spring arm of switch S1 is a hole in the printed circuit board, and below this hole is another hole in the plastic back body of the GFCI device. When the GFCI is loaded into a piece of test equipment designed to perform the required manufacturing tests, a mechanical test probe engages the spring arm of switch S1 through the two aforementioned holes, causing the spring arm of switch S1 to be pushed away from the contact and therefore opening the differential current circuit path. Manufacturing testing can now be performed without any circuit effect from this path, without burning out fault resistance R10, R13. The last test performed on the GFCI device in the test sequence is to disengage the probe from the spring arm of switch S1, which reconnects the differential current circuit path. Line voltage is then applied to the load contacts. The differential current causes the GFCI to trip, thereby checking the integrity of the differential current circuit path and components.

Another feature of the GFCI of the present invention relates to the indicator circuit that includes light element 140, and resistors R11, R12, R14. The indication device may be implemented as a neon light. Indicator 140 has multiple indication meanings. The first function of light 140 is as a trip indicator. The light is off if the GFCI is in the reset condition, and illuminates if the GFCI trips. The second function of light 140 is to indicate miswiring. A third function of light 140 is to notify the user that the GFCI is no longer operational because of a defective solenoid-driving device.

When the GFCI is wired properly such that the AC power source is connected to the line terminals and the contacts 120 are closed, there is no voltage across light 140 and resistor R12. Accordingly, light 140 is not energized. If the GFCI trips for any reason, line voltage is applied across indicator 140 and resistors R12 and R11 and light is emitted. When the device is reset, voltage is removed and light 140 is deenergized. As noted above, when the device is miswired it will continue to trip out immediately after reset. However, the user will notice that light 140 is not energized after tripping occurs. Of course, in the miswired state, there is no return path to neutral through resistor R11. Note that the wiring state detection functionality of the indicator circuit feature is not dependent on the fault resistance R10, R13. Accordingly, wiring state detection is provided by the present invention even if the miswire detection circuit has been previously used and the fault resistance cleared.

Indicating a defective solenoid driving device, such as SCR Q1, is achieved with the addition of a resistor R14. Light 140 is energized when the SCR Q1 short circuits because resistor R14 provides a path to supply neutral. When this occurs, and the device is reset, the GFCI trips, energizing light 140 through resistor R14. Continuously applied line voltage to the solenoid occurring as a result of a shorted SCR Q1 causes the trip solenoid (coil 110) to open within a few seconds. Coil 110 burns out since it is continuously energized, so it cannot trip again after the device is reset. When the GFCI is reset in this condition, light 140 remains energized, indicating a defective solenoid driving device. The value of resistor R14 must be kept low relative to the value of resistor R12 as a voltage divider occurs between resistors R12 and R14 which limits the voltage across light 140. A neon lamp needs a minimum of about 60 volts to arc over and energize. A value of 33K for resistor R14 is suitable for this embodiment, which provides for about 66 volts across the neon lamp at a worst case line voltage of 102 VAC. Computing different values for resistors R11, R12, and R14 based on different types of lights 140 is considered within the capabilities of one skilled in the art.

Yet another feature of the present invention relates to the voltage transient protection circuitry. The present invention includes a low pass filter circuit coupled in parallel with a metal-oxide varistor (MOV) across the hot line terminal and the neutral line terminal. The low pass filter includes capacitor C8 coupled in series with solenoid 110. The low pass filter circuit does what its name suggests, it filters out high frequency voltage components. Accordingly, the GFCI of the present invention is more likely to survive transient over-voltages than a GFCI without the low pass filter, or a GFCI without the low pass filter in combination with the MOV.

Figure 2:
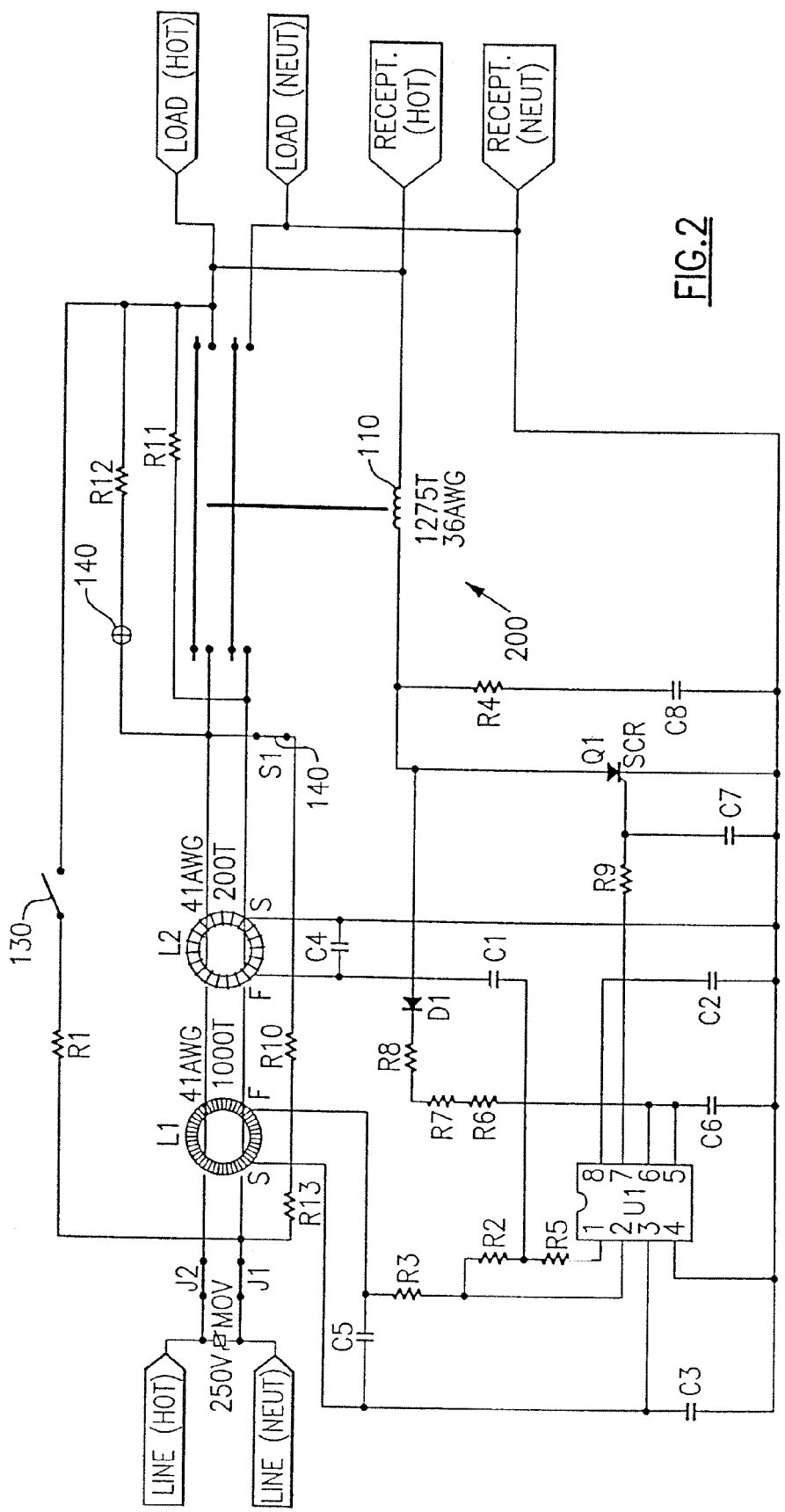
FIG. 2 shows a schematic of a lockout configuration according to an embodiment of the invention.

As embodied herein and depicted in FIG. 2, a schematic of a lockout configuration according to an embodiment of the invention is disclosed. In this embodiment of the invention, the protection device cannot be rest if the SCR shorts out, i.e., the device is "locked out." This is because breaker coil 110 draws its power from the load sides of contacts 120 instead of the line side as in the embodiment of FIG. 1. When the SCR shorts out, breaker coil 110 immediately trips and opens contacts 120. Opening contacts 120 breaks the current to the load side of the device, so breaker coil 110 is de-energized, preventing it from burning out. When attempting to reset the device, breaker coil 110 immediately trips out contacts 120, thus preventing the device from being reset. Since the device cannot be reset, resistor R14 is not used in this embodiment because there is no need to indicate via light 140 that the device has a faulty SCR; the inability to reset the device signals that condition.

Figure 3:
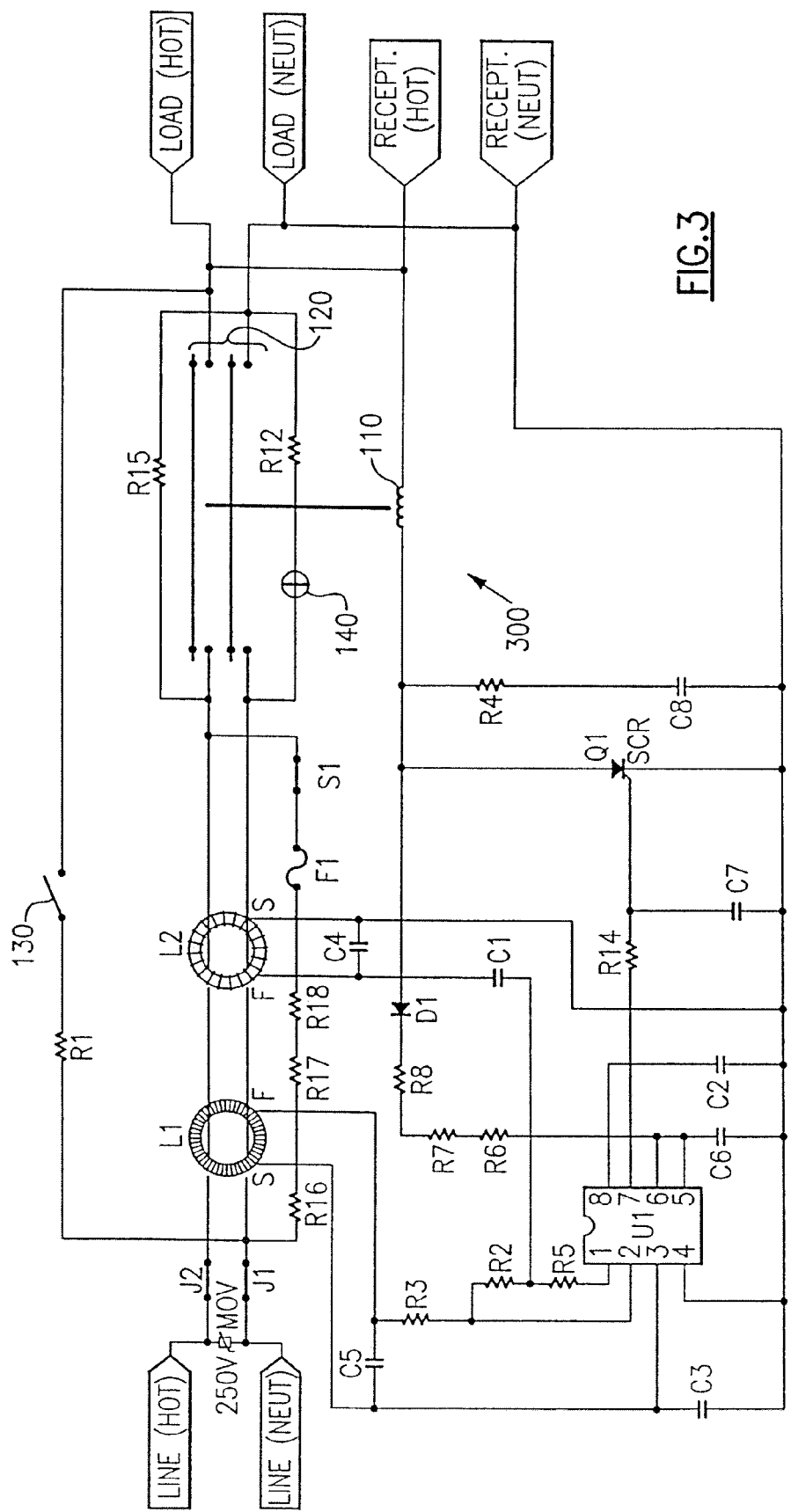
FIG. 3 shows a schematic of an alternative lockout configuration according to an embodiment of the invention.

Referring to FIG. 3, an alternative lock-out embodiment is shown at 300 which shows the series combination of light 140 and resistor R12 connected in parallel to the neutral conductor contact instead of the hot conductor contact as is the case in FIGS. 1 and 2. A resistor R15 completes the light circuit from load neutral to line hot. The miswire circuit fault resistance is shown here as resistors R16, R17, and R18 in series with fuse F1. This embodiment eliminates any trickle current that might be flowing if the device is miswired.

Figure 4:
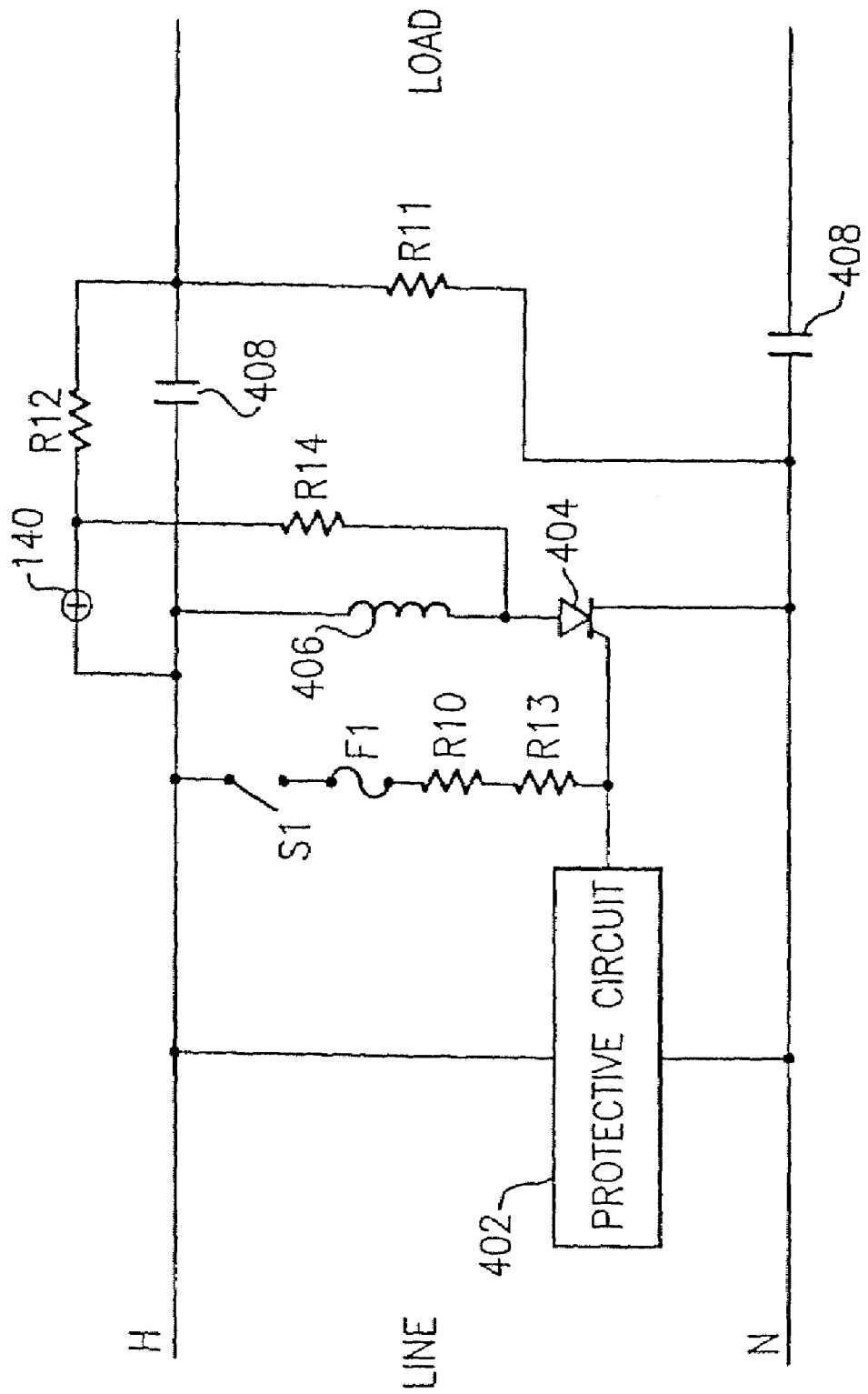
FIG. 4 shows a schematic of a protective circuit with miswire protection and an indicator lamp according to an embodiment of the invention.

Referring to FIG. 4, an embodiment of the invention is shown at 400 in which the protection device can be reset if the SCR shorts out. The embodiment is similar to the one shown in FIG. 1 except that it is generalized to apply to different protective devices such as ground fault circuit interrupters (GFCI's) or devices intended to interrupt ground faults from personnel contact with a power line conductor, arc fault circuit interrupters (AFCI's) intended to interrupt line current which if allowed to continue could cause an electrical fire, combination devices that provide both AFCI and GFCI protection, or the like.

According to this embodiment, the protective devices mentioned have a protective circuit 402 that detects the respective fault condition, turning on an electronic switching device such as SCR 404, energizing a solenoid 406 coil which receives power from the line conductors, to open interrupting contacts 408. Resistors R11, R12, R14, fault resistors R10, R13, normally closed switch S1, fuse F1, and light 140 have the same functions as previously described in the above embodiments. When power is miswired to the load terminals and the protective device is reset such that interrupting contacts 408 are closed, current flows are normally closed switch S1, fuse F1, fault resistors R10, R13 and the gate-cathode junction of SCR 404, energizing solenoid 406 and tripping the interrupting contacts 408. Fuse F1 and fault resistors R10, R13 are chosen to withstand the current flow for the time that power is applied to the load terminals to the moment when interrupting contacts 408 open, approximately 25 milliseconds. If line power is connected as intended to the line terminals of the protective device, current flows through normally closed switch S1, fuse F1, fault resistors R10, R13, and the gate cathode junction of SCR 404 until such time as fuse F1 clears, after which it is possible to accomplish a resetting of the interrupting contacts 408. Solenoid 406 is designed not to burn out during the interval that SCR 404 is conductive, which interval is designed to be approximately 100 milliseconds. In this manner the protective functions described in FIG. 1 are provided without necessarily requiring a differential current transformer L1 in the construction of the protective device nor attachment of the fault resistor and fuse circuit to both the hot and neutral line conductors. If an electronic switching device other than an SCR is used, e.g., a bipolar transistor, the connections shown here are being made to the gate of the SCR would instead be made to the base of the bipolar transistor. "Gate" and "base" are intended to have an equivalent meaning in this specification and claims.

A high voltage dielectric test requirement in the present UL Standard. This test is performed by applying a high voltage potential between line hot and load hot (and again between line neutral and load neutral) with the GFCI in the tripped condition. The light indication circuit connection between line and load hot in the previous embodiments may result in a test failure. Another potential relates to the maximum "leakage" current (Approximately 0.5 mA). The maximum allowable current may not be sufficient to drive an LED to achieve the desired light output in the indicator light.

Figure 5:
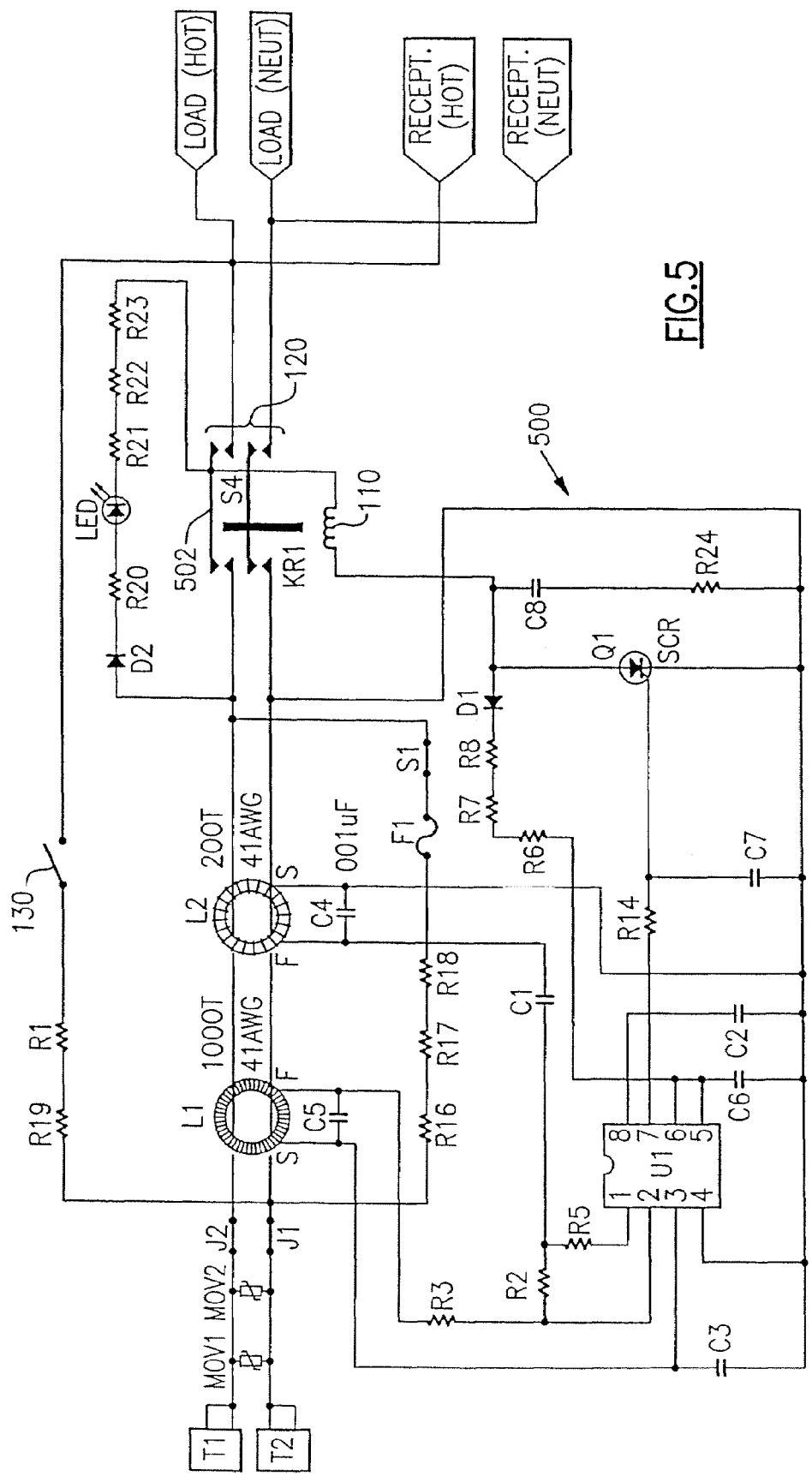
FIG. 5 shows a schematic of a protective circuit with miswire protection and an indicator lamp according to an embodiment of the invention.

Referring to FIG. 5, a circuit 500 is shown in which circuit power is derived from hot bus bar 502 of the tripping mechanism. Circuit 500 still meets the original circuit requirements of removing power to the SCR when the SCR shorts. When power is applied and the GFCI is in the reset condition, bus bar 502 is in contact with the line hot, so the circuit is powered. When a ground fault is senses by differential transformer L1, the GFCI device of this embodiment trips normally.

Another function of the original circuit was to have an indicator light that came on as a result of the GFCI tripping when the GFCI was correctly wired, but when the GFCI was miswired by bringing power to the load contacts, the indicator light would not energize when the GFCI was tripped. The indicator circuit of this embodiment includes a diode D2 in series with resistors R20, R21, R22, and R23, and an LED. When the properly wired GFCI trips and the SCR is not shorted out, bus bar 502 which provides power to circuit 500 is removed from contact with line hot. Current then flows through the indicator circuit, coil 110, diode D1, and resistors R6, R7, R8 to provide the power to illuminate the LED. Nominal current through the LED is about 4 ma.

The indicator circuit works in conjunction with the GFCI sense circuitry to power the indicator and to protect coil 110 in the event that the SCR shorts out. When the properly wired GFCI trips due to the SCR shorting, current still flows through the indicator circuit, coil 110, and then through the shorted SCR. Nominal current in this scenario is about 10 ma. Coil 110 is protected from burning out by the resistor chain R20, R21, R22, and R23. Diode D1 serves to half wave rectify the voltage for circuit 500, protects the LED from breaking over in the reverse direction when the GFCI is tripped, and halves the power across resistor chain R20, R21, R22, and R23 when the SCR shorts out.

When the GFCI is miswired, i.e., when the power is applied to the load terminals of the device instead of the line terminals of the device, the LED cannot light because there is no path for the current to take when the device is tripped. Thus, if the device is tripped and no light appears, the installer knows that the device is miswired.

Although the invention is described with respect to a GFCI, the invention is equally applicable to an AFCI or indeed to any circuit interrupting device.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention. It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A protective device comprising:
a plurality of line terminals and a plurality of load terminals;
a wiring state detection circuit configured to detect a wiring state associated with the plurality of line terminals and the plurality of load terminals, the wiring state indicating whether the plurality of line terminals or the plurality of load terminals are coupled to a source of AC power;
a fault detection circuit coupled to the plurality of line terminals and configured to generate a fault detection signal in response to detecting at least one fault condition;
an electronic switch actuator responsive to the wiring state detection circuit and the fault detection circuit; and
a circuit interrupter coupled to the electronic switch actuator, the circuit interrupter including four sets of interrupting contacts configured to provide electrical continuity at least between the hot line terminal and the hot load terminal and the neutral line terminal and the neutral load terminal in a reset state, the four sets of interrupting contacts being decoupled in a tripped state.

2. The protective circuit of claim 1, wherein the wiring state detection circuit is configured to permanently open circuit a predetermined time after AC power is coupled to the plurality of line terminals.

3. The protective circuit of claim 1, wherein the wiring state detection circuit includes at least one fusible element configured to permanently open-circuit a predetermined time after the AC power is coupled to the plurality of line terminals.

4. The protective circuit of claim 1, further comprising a low pass filter circuit having a capacitor coupled in series with a solenoid coil of the protective device, the low pass filter being coupled across a hot line terminal and a neutral line terminal of the plurality of line terminals.

5. The protective circuit of claim 4, further comprising a surge protection device coupled in parallel with the low pass filter, the surge protection device being configured to clamp transient voltages above a predetermined threshold level.

6. The protective circuit of claim 5, wherein the surge protection device is a MOV.

7. The protective circuit of claim 1, wherein the at least one fault condition includes the miswire fault condition.

8. The protective circuit of claim 1, wherein the four sets of the interrupting contacts are configured to open in response to receiving the fault detection signal.

9. The protective circuit of claim 8, the electronic switch actuator further comprising:
a rectifier element coupled to the fault detection circuit and the wiring state detection circuit; and
a solenoid coil coupled between the rectifier element and the four sets of interrupting contacts, the solenoid coil being configured to trip the four sets of interrupting contacts when the rectifier is in an ON state.

10. The protective circuit of claim 9, further comprising an indicator circuit coupled to the rectifier element, the indicator circuit being energized when the rectifier element is short circuited to thereby indicate an end-of-life condition.

11. The protective circuit of claim 1, further comprising an indicator circuit coupled to the circuit interrupter, the indicator circuit is configured to indicate a trip condition, a miswire condition, and/or an end-of-life condition.

12. The protective circuit of claim 1, further comprising an indicator element configured to generate a signal in the tripped state.

13. The protective circuit of claim 12, wherein the indicator element is configured to indicate a trip condition, a miswire condition, and/or an end-of-life condition.

14. An electrical wiring device comprising:
line terminals and load terminals;
at least one detection circuit including a circuit segment coupled between the line terminals and configured to generate a predetermined signal in response to detecting a proper wiring condition, the predetermined signal not simulating a fault condition, a proper wiring condition being effected when the line terminals are connected to a source of AC power; and
an interrupting contact assembly coupled to the at least one detection circuit, the interrupting contact assembly including four sets of interrupting contacts that are configured to provide electrical continuity between the line terminals and the load terminals in a reset state and configured to interrupt the electrical continuity in tripped state, the interrupting contact assembly being substantially prevented from effecting the reset state absent the predetermined signal being generated by the at least one detection circuit.

15. The device of claim 14, wherein the four sets of interrupting contacts comprise a bridge structure.

16. The device of claim 15, wherein a line terminal, load terminal and an electrical path are shorted together by the circuit interrupter when in the reset state and electrically disconnected from each other when in the tripped state.

17. The device of claim 16, wherein an indicator light is disposed in the electrical path.

18. The device of claim 14, wherein the at least one detection circuit includes a wiring state detection circuit configured to generate the predetermined signal.

19. The device of claim 18, wherein the wiring state detection circuit is configured to permanently open circuit a predetermined time after AC power is coupled to the line terminals.

20. The device of claim 19, wherein the wiring state detection circuit includes at least one fusible element configured to permanently open-circuit a predetermined time after the AC power is coupled to the line terminals.

21. The device of claim 14, wherein the at least one detection circuit includes a fault detection circuit coupled to the line terminals, the fault detection circuit being configured to generate a fault detection signal in response to detecting at least one fault condition.

22. The device of claim 21, wherein the at least one detection circuit includes a miswire detection circuit configured to generate a miswire fault condition.

23. The device of claim 21, wherein the four sets of the interrupting contacts are configured to open in response to receiving the fault detection signal.

24. The device of claim 21, further comprising:
a rectifier element coupled to the fault detection circuit, the rectifier element being turned ON in response to the fault detection signal; and
a solenoid coil coupled between the rectifier element and the four sets of interrupting contacts, the solenoid coil being configured to trip the four sets of interrupting contacts when the rectifier in the ON state.

25. The device of claim 14, further comprising a low pass filter circuit having a capacitor coupled in series with a solenoid coil of the protective device, the low pass filter being coupled across a hot line terminal and a neutral line terminal of the plurality of line terminals.

26. The device of claim 25, further comprising a surge protection device coupled in parallel with the low pass filter, the surge protection device being configured to clamp transient voltages above a predetermined threshold level.

27. The device of claim 26, wherein the surge protection device is a MOV.

28. The device of claim 14, wherein one of the line terminals, a corresponding one of the load terminals and an electrically conductive path are electrically connected by the circuit interrupter when in the reset state and electrically disconnected from each other when in the tripped state.

29. The device of claim 28, wherein an indicator light is disposed in the electrically conductive path.

30. An electrical wiring device comprising:
a plurality of line terminals and a plurality of load terminals;
a ground fault detection circuit coupled to the plurality of line terminals and the plurality of load terminals;
a wiring state detection circuit coupled to the plurality of line terminals and configured to generate a predetermined response when the plurality of line terminals are properly connected to a source of AC power, the wiring state detection circuit being permanently disabled after the occurrence of the predetermined response;
a solenoid coil coupled to the wiring state detection circuit; and
a circuit interrupter including four sets of interrupting contacts configured to provide electrical continuity between the plurality of line terminals and the plurality of load terminals in a reset state and decouple the four sets of interrupting contacts in a tripped state, the circuit interrupter being substantially prevented from effecting the reset state until an occurrence of the predetermined response.

31. The device of claim 30, wherein the predetermined response includes an open circuit condition that occurs a predetermined time after AC power is coupled to the plurality of line terminals.

32. The device of claim 30, wherein the wiring state detection circuit is configured to drive the circuit interrupter into a tripped state if the plurality of load terminals are improperly wired to a source of AC power before the occurrence of the predetermined response.

33. The device of claim 30, wherein the predetermined response includes a current signal.

34. The device of claim 33, wherein the wiring state detection circuit includes at least one circuit element configured to permanently open in response to the predetermined current signal being applied thereto.

35. The device of claim 33, further comprising an electronic switch element configured to energize the solenoid in response to a signal from either the ground fault detection circuit or the wiring state detection circuit.

36. The device of claim 1, wherein one of the line terminals, a corresponding one of the load terminals and an electrically conductive path are electrically connected by the circuit interrupter when in the reset state and electrically disconnected from each other when in the tripped state.

* * * * *

(12) INTER PARTES REEXAMINATION CERTIFICATE (766th)
United States Patent
Finlay, Sr. et al.

(10) Number: US 7,283,340 C1
(45) Certificate Issued: *Dec. 11, 2013

(54) ELECTRICAL WIRING DEVICE

(75) Inventors: David A. Finlay, Sr., Marietta, NY (US); Thomas N. Packard, Syracuse, NY (US)

(73) Assignee: Pass & Seymour, Inc., Syracuse, NY (US)

Reexamination Request:
No. 95/000,477, Jun. 16, 2009
No. 95/001,224, Oct. 22, 2009

Reexamination Certificate for:
Patent No.: 7,283,340
Issued: Oct. 16, 2007
Appl. No.: 11/469,604
Filed: Sep. 1, 2006

( * ) Notice: This patent is subject to a terminal disclaimer.

Related U.S. Application Data

(63) Continuation of application No. 10/884,304, filed on Jul. 2, 2004, now Pat. No. 7,133,266, which is a continuation of application No. 09/971,525, filed on Oct. 5, 2001, now Pat. No. 6,856,498, which is a continuation of application No. 09/718,003, filed on Nov. 21, 2000, now Pat. No. 6,522,510.

(51) Int. Cl.
*H02H 3/16* (2006.01)

(52) U.S. Cl.
USPC .................... 361/45; 361/42; 361/49; 361/77

(58) Field of Classification Search
None
See application file for complete search history.

(56) References Cited

To view the complete listing of prior art documents cited during the proceedings for Reexamination Control Numbers 95/000,477 and 95/001,224, please refer to the USPTO's public Patent Application Information Retrieval (PAIR) system under the Display References tab.

*Primary Examiner* — Linh M. Nguyen

(57) ABSTRACT

The present invention is directed to a protective device that includes a plurality of line terminals and a plurality of load terminals. A wiring state detection circuit is configured to detect a wiring state associated with the plurality of line terminals and the plurality of load terminals. A fault detection circuit is coupled to the plurality of line terminals and configured to generate a fault detection signal in response to detecting at least one fault condition. A circuit interrupter is coupled to the fault detection circuit. The circuit interrupter includes four sets of interrupting contacts configured to provide electrical continuity at least between the hot line terminal and the hot load terminal and the neutral line terminal and the neutral load terminal in a reset state. The four sets of interrupting contacts are open in a tripped state.

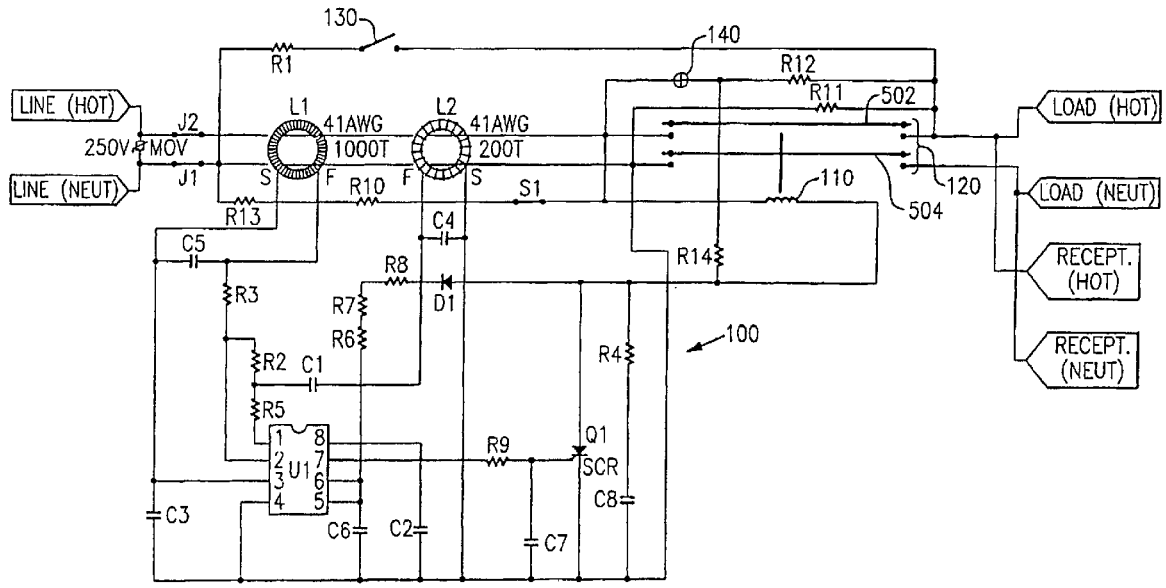

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

The patentability of claims 1, 8, 9, 11-13 and 36 is confirmed.

Claims 14-18, 21-24, 28 and 29 are cancelled.

Claims 2-7, 10, 19, 20, 25-27 and 30-35 were not reexamined.

* * * * *